United States Patent
Rapeli

(10) Patent No.: US 6,182,032 B1
(45) Date of Patent: Jan. 30, 2001

(54) TERMINAL SWITCHING TO A LOWER SPEECH CODEC RATE WHEN IN A NON-ACOUSTICALLY COUPLED SPEECH PATH COMMUNICATION MODE

(75) Inventor: Juha Rapeli, Le Mans (FR)

(73) Assignee: U.S. Philips Corporation, New York, NY (US)

(*) Notice: Under 35 U.S.C. 154(b), the term of this patent shall be extended for 0 days.

(21) Appl. No.: 09/150,554

(22) Filed: Sep. 10, 1998

(30) Foreign Application Priority Data

Sep. 10, 1997 (EP) .................................. 97402107
Sep. 18, 1997 (EP) .................................. 97402172

(51) Int. Cl.$^7$ .................................................. G10L 11/06
(52) U.S. Cl. .................................................. 704/214
(58) Field of Search .................................. 704/214, 270, 704/201

(56) References Cited

U.S. PATENT DOCUMENTS

| | | | |
|---|---|---|---|
| 4,593,282 | * 6/1986 | Acampora et al. | 340/825.5 |
| 4,747,096 | * 5/1988 | Piasecki et al. | 370/81 |
| 4,890,316 | * 12/1989 | Walsh et al. | 379/98 |
| 5,023,869 | * 6/1991 | Grover et al. | 370/84 |
| 5,195,090 | * 3/1993 | Bolliger et al. | 370/94.1 |
| 5,305,308 | * 4/1994 | English et al. | 370/32.1 |
| 5,327,421 | * 7/1994 | Hiller et al. | 370/60.1 |
| 5,390,175 | * 2/1995 | Hiller et al. | 370/60 |
| 5,422,882 | * 6/1995 | Hiller et al. | 370/60.1 |
| 5,426,636 | * 6/1995 | Hiller et al. | 370/60.1 |
| 5,428,607 | * 6/1995 | Hiller et al. | 370/60.1 |
| 5,452,297 | * 9/1995 | Hiller et al. | 370/60.1 |
| 5,541,852 | * 7/1996 | Eyuboglu et al. | 364/514 |
| 5,544,164 | * 8/1996 | Baran | 370/60.1 |
| 5,600,645 | * 2/1997 | Boyer et al. | 370/395 |
| 5,815,505 | * 9/1998 | Mills | 370/552 |
| 5,912,895 | * 6/1999 | Terry et al. | 370/445 |

* cited by examiner

Primary Examiner—Krista Zele
Assistant Examiner—Michael N. Opsasnick

(57) ABSTRACT

A communication system has a network and a number of terminals. The network and the terminals have multi-rate speech encoders and decoders. Two terminals may communicate with each other through two-way voice communication where voice paths of the two-way voice communication are acoustically coupled to each other. The two terminals may also communicate through at least one non-acoustically coupled path. If the two terminals communicate through at least one non-acoustically coupled path, multi-rate encoders and decoders assigned to the non-acoustically coupled path operate at a lower bit rate than in a situation in which the two terminals operate through two-way voice. Whether a communication between the two terminals is through at least one non-acoustically coupled path is established a priori or dynamically.

12 Claims, 4 Drawing Sheets

TERMINAL SWITCHING TO A LOWER SPEECH CODEC RATE WHEN IN A NON-ACOUSTICALLY COUPLED SPEECH PATH COMMUNICATION MODE

BACKGROUND OF THE INVENTION

1. Field of The Invention

The present invention relates to a communication system comprising a network, and a plurality of terminals, the network and the terminals comprising multi-rate speech encoding and decoding means. Such a communication system can be a cellular or cordless telephony system, a wired system such as a public switched telecommunications network (PSTN) or an Internet, a mixed wired/wireless system, or any other suitable system with terminals having speech encoding and decoding means.

The present invention further relates to a terminal for use in such a communication system.

2. Description of the Related Art

A communication system of the above kind is known from the article "A Multi-rate Transcoder", A. Lovrich et al., IEEE Transactions on Consumer Electronics, Vol. 35, No. 4, November 1989, pp. 716-722. In this article, a multi-rate speech transcoder is described for speech encoding of 64 kbit/s PCM (Pulse Code Modulation) data or decoding encoded speech to 64kbit/s PCM data. The described multi-rate transcoder is a DSP (Digital Signal Processor) programmed to support three coding rates, 64 kbit/s PCM, 32 kbit/s ADPCM (Adaptive Differential Pulse Code Modulation), and 16 kbit/s SBC (Subband Coding). On page 721, various telecommunication applications of this transcoder are described, such as mobile radio telephony and voice mail systems in which the recipient can be another PC (Personal Computer) on a LAN (Local Area Network). For mobile radio, the said article advises to use a speech transcoder with a bit rate of 16 kbit/s, and for voice mail it is advised to use a 32 kbit/s ADPCM or a 16 kbit/s SBC transcoder. In a communication system such as a mobile radio system, the usual service is a real time bi-directional communication voice connection, also called a full duplex voice communication link. To such a voice communication link, a typical voice transmission problem is related to an echo caused by several network elements, but predominantly a terminal at the other end of the communication link, the so-called B-end-terminal. The said B-end is coupling back the voice signal arriving at its receiver via two mechanisms, namely intentional electronically implemented coupling, and via acoustic connection from its earpiece to the microphone of the transmitter. This voice coupling becomes then transported back to the point of origin of the voice, in case the so-called A-end-terminal. This coupling, called as loop-back is to give the impression to the subscriber at the A-end of having a "live voice connection" with the B-end. Furthermore, there are local acoustic loop backs at the A-end and the B-end to give the A-end and B-end subscribers the impression of a "live connection" if the subscriber at the other end is silent.

In digital mobile radio systems like GSM (Global System for Mobile Communications), DTX (Discontinuous Transmission) is applied when the B-end is silent. Before actually disconnecting the transmission at the B-end, first an estimated background noise at the B-end is transmitted to the A-end. Then, at the A-end so-called comfort noise is generated to give the A-end subscriber the impression of a still "live link". Because of the above acoustic coupling paths, in a digital mobile radio such as GSM having a relatively long round trip signal delay between the A-end and B-end terminal, caused by encoding and decoding delays and transmission delays, without echo cancelling, the voice signal of the A-end subscriber would be strongly repeated in the earpiece of the A-end terminal. In a GSM system, the round trip signal delay would typically be 200 msec. Without echo cancelling, such a delayed echo of own voice would be experienced as extremely annoying. For this reason, in such systems echo cancellers are applied. If the round trip signal delay would become too large, it would be virtually impossible to design an echo canceller within the boundaries of a given specification. Particularly, a too long encoding and decoding delay would be problematic. At present, particularly mobile radio systems offer a still increasing number of services, including voice mail. Such a service is a one-way speech or voice service.

Furthermore, the GSM system explained above has the capability of deploying the radio resources in a flexible way, in particular when using its slow frequency hopping mode. Therein the data burst of one user is transmitted as a sequence of shorter bursts spread over a random sequence of frequences. If one or even several of these random frequencies would be simultaneously used by other users as interferers, despite of system procedures to minimise such an interference, the channel coding is able to recover the data of interfered bursts. Accordingly, even short instantaneous pauses in any radio transmission direction, change-over from full frames to transmitting shorter half frames, or the switch-off of an entire transmission direction will reduce, especially in high load conditions, the radio interference between users and, accordingly, increase the number and/or quality of communications which the system can support within a radio environment.

SUMMARY OF THE INVENTION

It is an object of the present invention to provide a communication system of the above kind, particularly a mobile radio system, offering various kinds of speech services, in which an optimal use is made of system resources.

To this end the communication system according to the present invention is characterised in that at least one of the terminals comprises switching means for switching over from acoustic voice paths to at least one non-acoustic path, the system being arranged for establishing whether a connection of a terminal to another terminal is a one-way voice communication link, and for causing the switching means to switch over to the at least one non-acoustic path and the multi-rate speech encoding and decoding means to adopt a lower voice coding rate than used for a two-way voice communication link, if it is established that the connection is a one-way voice communication link.

The present is based upon the insight that there is no acoustic or electronic noise or voice loop back if the B-end terminal is a non-acoustically coupled device and thus neither would need a loop back for the voice signal, nor any echo cancelling. It is realised that under such circumstances a longer one-way signal delay can be accepted. It is further realised possible to modify the encoding and decoding delays of the speech codec as the contribution to the one-way signal delay, and that encoding and decoding delay relates to the bit rate of the speech codec. Generally, for a typical conversation voice signal and a particular codec type, a longer encoding and decoding delay enables coding into and from a lower bit rate.

The advantages of the present advantages are thus a less demand for radio resources and immediate radio transmission, resulting in a better and more efficient use of the available system resources such as radio resources such as radio transmission capacity. Accordingly and herewith, more voice links can be accommodated to a given frequency band, resulting in a reduction of operational costs for the system operator and/or subscriber. Modern communication systems, such as GSM, are equipped to use even those radio resources that remain otherwise unused in one direction or instantaneously remain unused in one direction. For a cheaper resource, the operator could charge lower costs to the subscriber. In addition to voice mail according to the present invention, other services such as voice messaging, and voice recognition based services can benefit from this invention.

Embodiments are claimed in the dependent claims. If the systems knows a priori that the communication link is a one-way communication link, then the switching between coding rates and adjustment of side tones can be controlled via signalling. Herewith, a very robust system is obtained. A terminal could be programmed to inform the system it desires a one-way voice communication, and the system could adapt its resources accordingly. The system can also dynamically detect whether the communication link is a one-way voice communication link. Such an embodiment resembles a two way communication except for the features related to voice delay and setting of side tones. Before opening the other direction of communication, firstly, the voice activity has to be detected in a reliable way, and then, the selection of coding with a low delay has to take place together with signalling for setting the side tone coupling back to values for two way communication. Therefore, some end-to-end signalling is needed before opening the acoustic path in the other direction. Accordingly, the delay for opening the second voice link direction would be longer than in the known method where voice activity is detected and transmission only discontinued for a duration of no activity. An embodiment of a system according to the present invention is modified in that an asymmetric encoding/decoding is applied, particularly by applying segmented decoding. Herewith, a very flexible system is obtained, which works optimally under all voice communication circumstances. Asymmetric encoding/decoding is known as such.

BRIEF DESCRIPTION OF DRAWINGS

The present invention will now be described, by way of example, with reference to the accompanying drawings, wherein FIG. 1 schematically shows a communication system according to the present invention.

Throughout the figures the same reference numerals are used for the same features.

DESCRIPTION OF THE PREFERRED EMBODIMENTS

Figure 1:
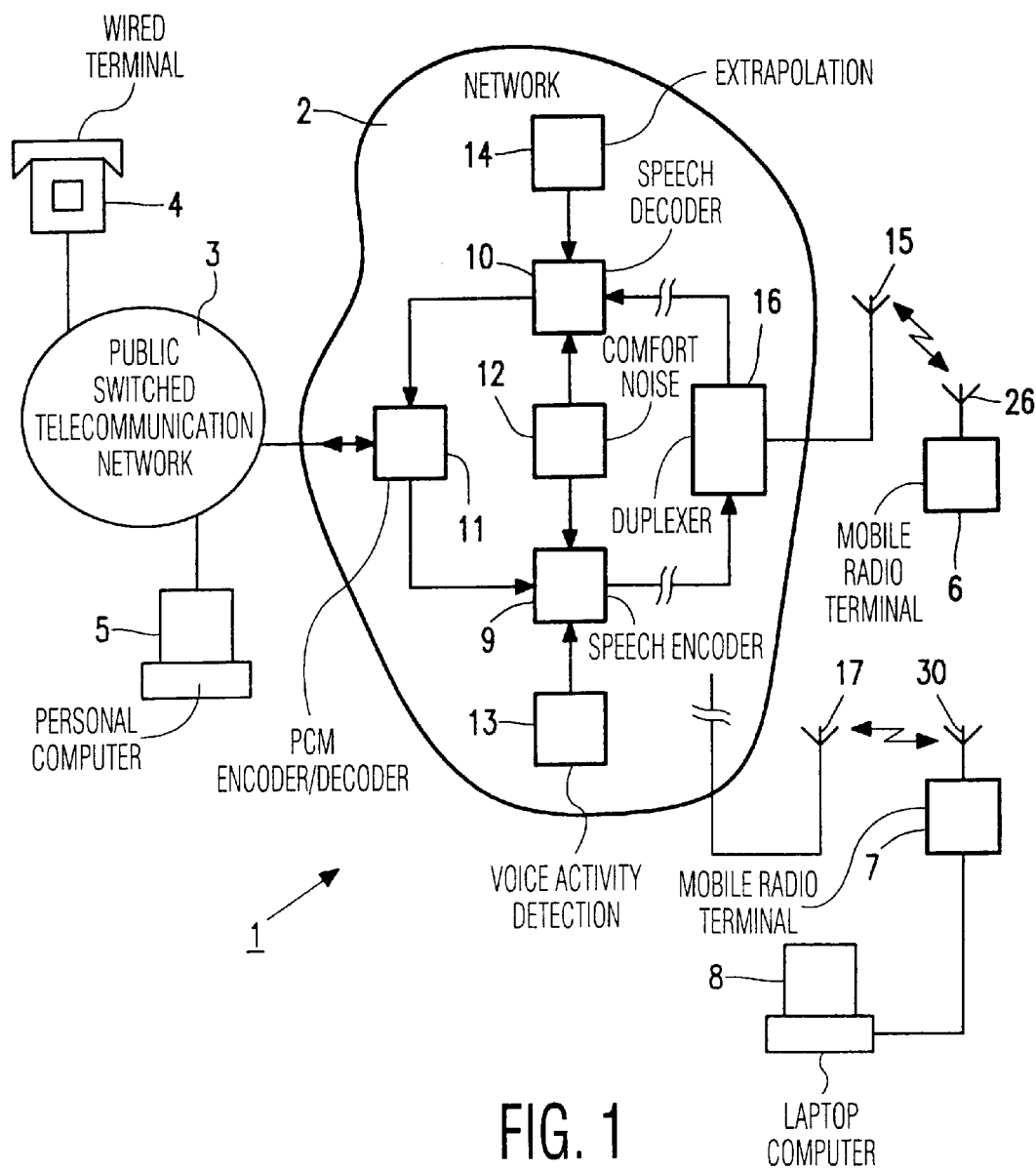

FIG. 1 schematically shows a communication system 1 according to the present invention. The system 1 comprises a network 2 which can be a cellular telephony network such as a GSM network, which is an FD/TDMA (Frequency Division/Time Division Multiple Access) network, a CDMA (Code Division Multiple Access) network such as an IS-95A network, IS-95A being a US TIA cellular radio standard, or any other suitable network with digital speech codecs. In the system 1, speech codecs are multi-rate codecs. The network 2 is coupled to a public switched telecommunication network 3 to which at least one wired terminal 4 is coupled. The public switched network 3 can be coupled to the Internet (not shown) so that Internet facilities and e-mail are available. Further shows is a personal computer 5 having a modem and programmed to operate voice mail programs, speech recognition programs, or the like. Such personal computers are well-known as such. The system further comprises a mobile radio terminal 6 and a mobile radio terminal 7 which is coupled to a Laptop computer 8. The Laptop computer 8 comprises a mass storage or hard-disk (not shown) for storing data and signals and communication programs which can be executed by the computer 8. Such Laptop computers are well-known as such. The cellular network 2, which can be a GSM network, is only schematically indicated. GSM networks are well-known and are comprised of so-called Mobile Switching Centers, Base Station Controllers, and Base Transceiver Stations (not shown in detail). In the sequel, only parts of the network relevant for the invention are described. In a particular network, the described functionality can be distributed over the various hardware parts of the GSM system. The transcoders can be part of the MSC or can be implemented more into the direction of the base transceiver stations, depending on the particular implementation. In the network 2, one transcoder is shown, comprising a speech encoder 9 and a speech decoder 10, at the side of the switched network 3 both being coupled to a PCM encoder/decoder 11. The PCM encoder/decoder 11 encodes analog speech into 64 kbit/s speech samples to be further processed by the speech encoder 9 or decodes 64 kbit/s speech samples generated by the speech decoder 10. A typical multi-rate speech codec is a variable data rate two-way voice codec such as described in the US TIA IS-96-A standard, May 1995, pp. 2-1, 2-2, 2-7, and 2-8. Another multi-rate voice codec can be the so-called AMR (Adaptive Multi-Rate) codec currently under standardisation within ETSI (European Telecommunication Standard Institute) for GSM and PCS-1900. In GSM, inter alia, the speech codec supports DTX (Discontinuous Transmission). In that case, a comfort noise functional block 12 generates comfort noise if a VAD (Voice Activity Detection) functional block 13 detects a speech pause. At the side of the speech decoder 10, an extrapolation functional block 14 is shown. At the side of the radio interface, the speech encoder 9 and decoder 10 are coupled to an antenna 15 via an antenna duplexer 16. As described, the physical location of the transcoders can be in the Mobile Switching Center, whereas the antenna 15 and the antenna duplexer 16 are comprised in a Base Transceiver Station. Such an architecture is well-known as such and not shown in detail here. At the side of the network 2, a further antenna 17 is shown, belonging to the same or to another Base Transceiver Station. Via the antenna 15 the network 2 communicates with the terminal 6, and via the antenna 17 the network 2 communicates with the terminal 7. As is well-known in a GSM network, subscriber payload is communicated via traffic channels, whereas signalling is done via control channels. Such signalling includes call set-up and monitoring, control of system resources, and any other control task.

Figure 2:
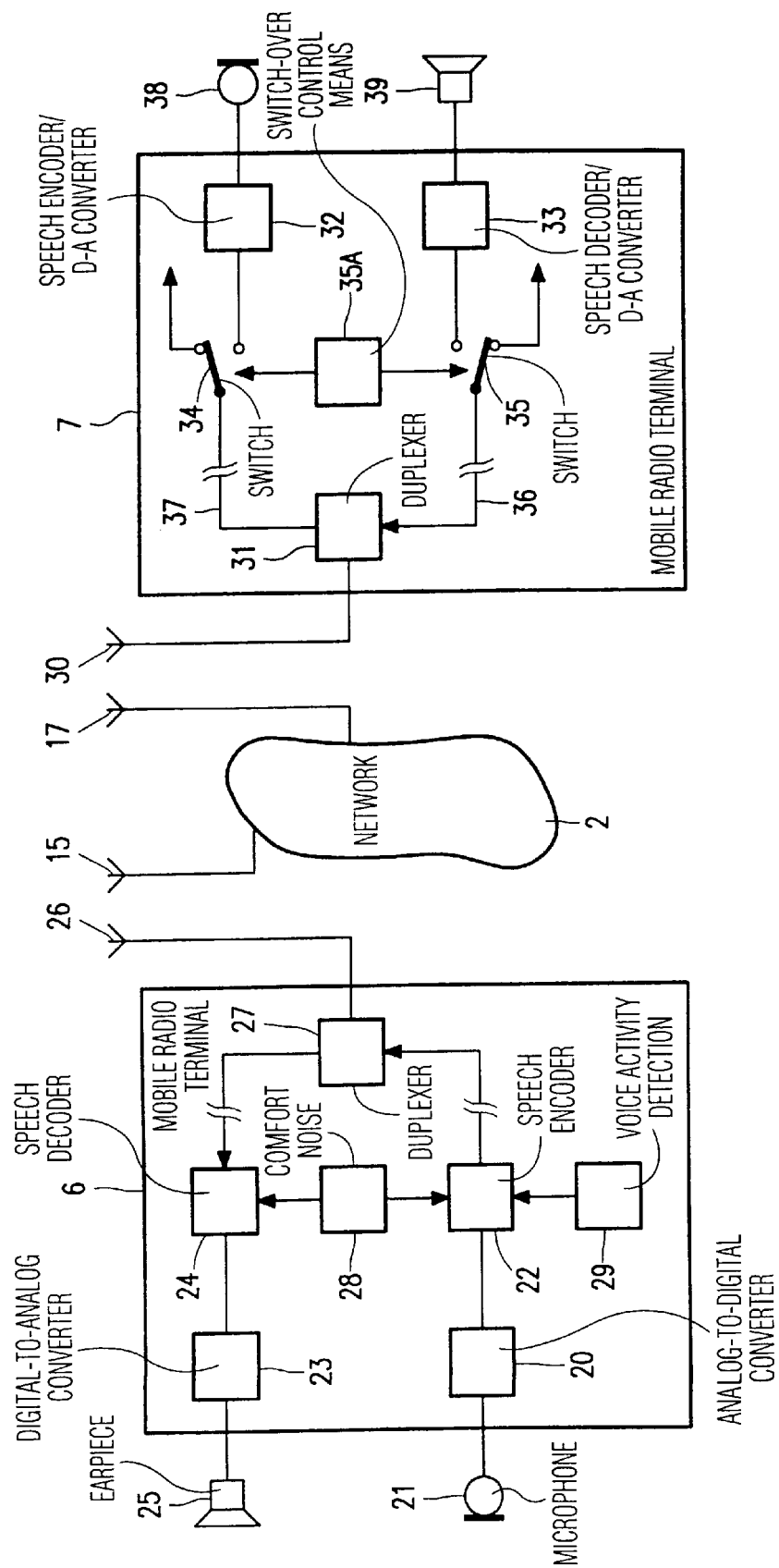
FIG. 2 shows a block diagram of terminals according to the present invention, FIG. 3 schematically shows a network according to the present invention.

FIG. 2 shows a block diagram of the terminals 6 and 7 according to the present invention, communicating with each other via the radio or cellular network 2. The terminal 6, being a mobile radio terminal, comprises an analog to digital converter 20, at input side being coupled to a microphone 21 and at output side to a speech encoder 22, a digital to analog converter 23, at input side being coupled to a speech decoder 24 and at output side to an earpiece or speaker 25, and further well-known radio circuitry such as a modulator/demodulator, mixers, frequency synthesisers, and an antenna 26 coupled to an antenna duplexer 27. As in the network 2, the terminal 2 comprises a comfort noise functional block 28 and a voice activity functional block 29. The terminal 7, also being a mobile radio terminal, comprises similar radio circuitry coupled to an antenna 30 via an antenna duplexer 31. The terminal 7 further comprises a speech encoder/A/D-converter 32 and a speech decoder/D/A-converter 33. According to the present invention, the terminal 7 comprises switching means, here switch-over switches 34 and 35, for switching over the terminal 7 from a two-way voice communication link to a one-way voice communication link without acoustic feedback, and switch-over control means 35A. In one-way voice mode, speech path 36 is switched as a sink, and/or speech path 37 is switched as a source. The source can be, besides a microphone, a Laptop computer device 8, for instance, sending voice mail messages, and the sink can be the Laptop 8 receiving voice mail messages from the PC 5, for instance, or from another mobile radio terminal coupled to a non-acoustic device, or from a service provider in the network. When in one-way voice mode, the multirate encoding and decoding means are set in a low bit rate mode, lower than a bit rate used for a full duplex or semi-duplex voice communication link. As described, this usually corresponds to a longer signal delay from the terminal 6 to the terminal 7, or vice versa. Control commands for controlling the speech encoding and decoding means to adopt a lower bit rate can be conveyed either over signalling sub-channels associated with traffic channels, or via a radio control channel as described. Such a situation can occur, for instance, if the subscriber at the terminal 7 activated voice mail software. Upon activation of the voice mail, the terminal 7 can send a message to the network 2, instructing the network 2 to set its corresponding encoding and decoding means to a lower bit rate. The terminal 7 itself can immediately set its encoding and decoding means to a lower bit rate, or can wait for an acknowledgement from the network 2. Waiting for an acknowledgement has the advantage that it is made sure that at both sides the codecs have adopted the same rate before the actual transmission is started. A dynamic but possibly less secure, but still possible, way is detection in one of the terminals 6 and 7 and/or in the network 2 whether the communication is a one-way voice communication, and so likely a voice mail, or the like. Such and approach is appropriate for one type of services, such as voice recognition based services because, the service has also to define the end of voice message to be recognized. Thus the additional feature necessary in the communication part is a signalling which enables the speech codec to determine the end of voice to be transmitted and later recognised by the system providing the service. The terminal 7 further comprises a microphone 38 and an earpiece or speaker 39.

Figure 3:
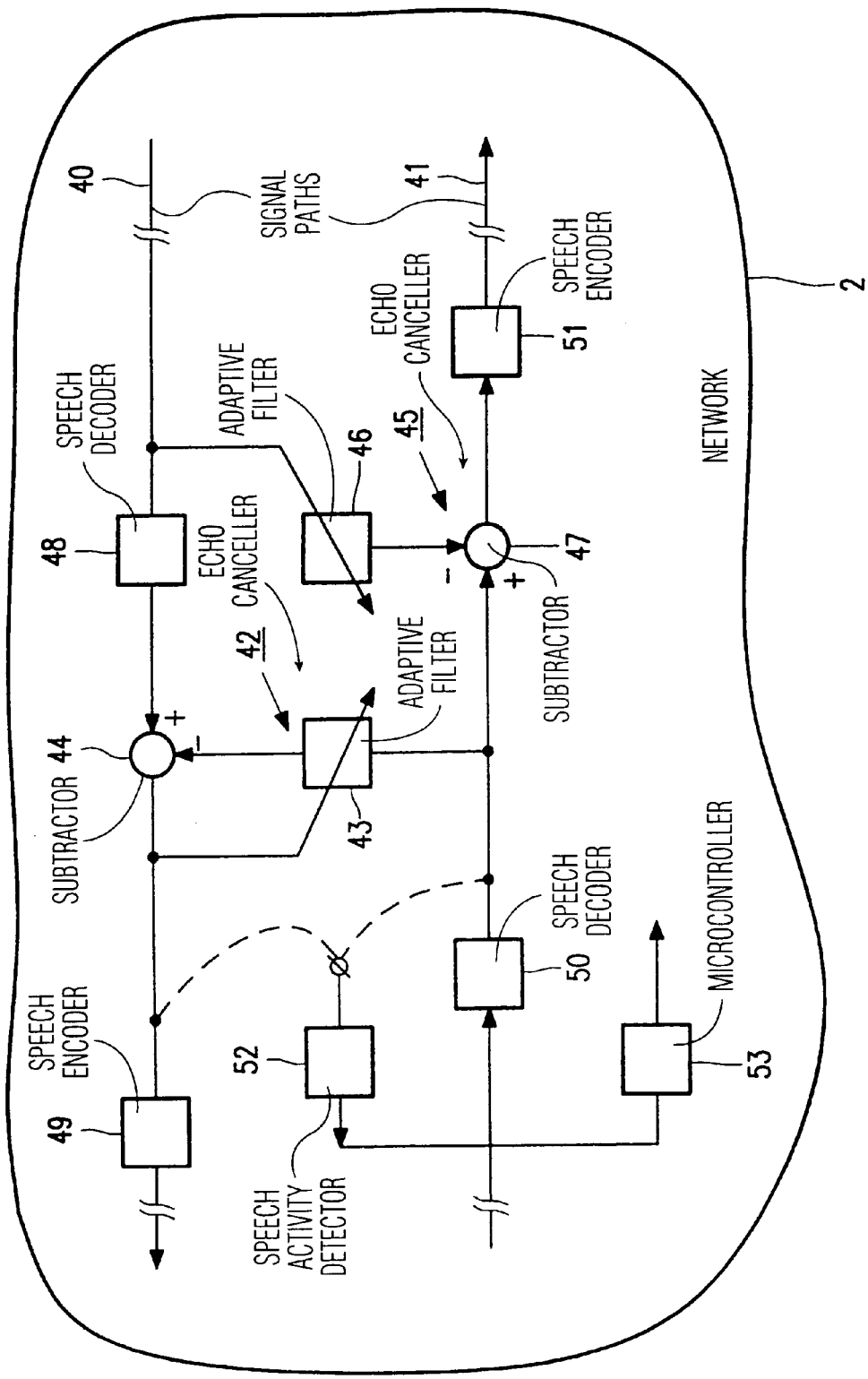

FIG. 3 schematically shows the network 2 according to the present invention. Shown are network means including a signal path 40 coupled to the signal path 37 in the terminal 7, and a signal path 41 coupled to the signal path 36 in the terminal 7. The network 2 comprises a first echo canceller 42 comprised of an adaptive filter 43 and a subtractor 44, and a second echo canceller 45 comprised of an adaptive filter 46 and a subtractor 47. Furthermore, in the signal path 40, the network 2 comprises a speech decoder 48 generating 64 kbit/s data suitable for echo cancelling, and a speech encoder 49 for generating speech encoded data after echo cancelling. Similarly, in the signal path 41, the network comprises a speech decoder 50 and a speech encoder 51. In the embodiment in which one-way speech activity is detected rather than being known a priori, the network 2 can comprise a speech activity detector 52, which can be coupled at input side at various signal paths in the network 2, as indicated with the dashed line. Most often, such part of the network belongs to the device terminating a voice connection, and can be a voice mail server, for instance. At its output side, the detector 52 is coupled to a microcontroller 53 providing commands for conveying to the terminal via a control channel. The echo cancellers 42 and 45 can be by-passed if the system has been set in a one-way voice mode. In a GSM system, usually the codecs 48, 49, 50, and 51 cannot be by-passed. This is because, also for mobile terminal to mobile terminal communication, signal transport within the network 2 is done via 64 kbit/sec land lines. For simplicity, in FIG. 3, the PCM encoders an decoders are not shown in the network 2. Otherwise, for a one-way voice communication, the codecs 48, 49, 50, and 51 could also be by-passed.

When a one way voice connection is activated, or detected with e.g. terminal A (6 in FIG. 2) being the controlling device and the origin of the voice, such a request for one way voice features is signalled to the terminating device B (7 in FIG. 2). Accordingly, terminal B adjusts its loop back of its incoming voice to zero and disconnects its acoustic path. If the terminals 6 and 7 (FIG. 2) are connected to the network 2 over a radio link, one-way voice is carried in up-link direction from the terminal 6 and in down-link direction to the terminal 7. The communication in up-link direction from the terminal 7 to the network 2 and in down-link direction from the network 2 to the terminal 6 is restricted to maintenance of the communication links. The terminals 6 and 7 are controlled in such a way that even high acoustic coupling from earpiece to microphone would not activate any up-link transmission from them. Thus it can be assumed that no echoes are generated by either terminating device of the voice connection, and accordingly, the existing echo cancellers in the network transmission parts (e.g. international lines) are able to cope with a larger delay in the radio transmission parts acually used. E.g., in a GSM network, one way delay over the radio channel is nearly 100 msec and the round-trip delay up to 200 msec. In one way communication, the far most loop-back point, for voice originating from the terminal 6, is the network connection to the radio base station of the network 2. Terminal 6 or any other part of the system would not experience any echoes generated in the radio transmission to of from terminal 7, or the terminal 7 itself. Thus the delay portion from the network 2 to the terminal 7 can be used as an additional delay in the speech transmission and processing elsewhere, allowing for a longer speech coding delay. This extended speech coding delay, accordingly, can be used to achieve either a lower bit rate coding at a given quality, or a higher voice quality with keeping the bit rate essentially the same as for coding of conversational voice with a shorter delay. Such a long coding delay one-way codec can be a parameter variation of the two-way, short delay voice codec, or a separated codec with very little commonality between such two codecs. When switching the voice to another direction, the speech frames originated from the controlling device will contain signalling to switch the direction of transmission, to open relevant voice paths etc. Because transmission delay and uncertainty will be associated with this switch-over, an additional mechanism of delayed switching-over is used. Therein, speech signalling contains in-band signalling telling the other termination to switch over after a defined time interval after reception of the message. Such a message can be associated as signalling to, e.g., voice prompts of voice controlled services in such a way that the voice direction is switched over immediately after, e.g., a machine has given a question or instruction to the user. This requires that the command for switching over is signalled well before the end of the voice prompt. Depending on the service in question, then the control of voice transmission direction and parameters is, either temporarily transferred to terminal B, for the dureation of voice activity, or maitained within terminal A (6 in FIG. 2). E.g., in the case of dropping a voice mail, there is no need to transfer the control from voice mail box because the calling party only drops a message and then terminates the call. In the case of interactive voice services, switch-overs of control between terminations are more frequent. After having changed the voice direction of switched it over to a two way, if required by service, the detection of voice activity can reside either in the controlling device or in the device originating the voice, with these being not necessarily the same device. For such a case, the voice activity detection detects the well-known instantaneous active and silent pauses if discontinuous transmission is used, but additionally, it detects the end of the voice message. Therefore, it is called here voice message detection, and can be, additional to detecting the beginning and the end of a voice message, activated by recognised voice commands for start and/or stop. As examples, the words "start" and "end" can be trained by the system or by the user to start and stop a voice message to be transmitted.

Figure 4:
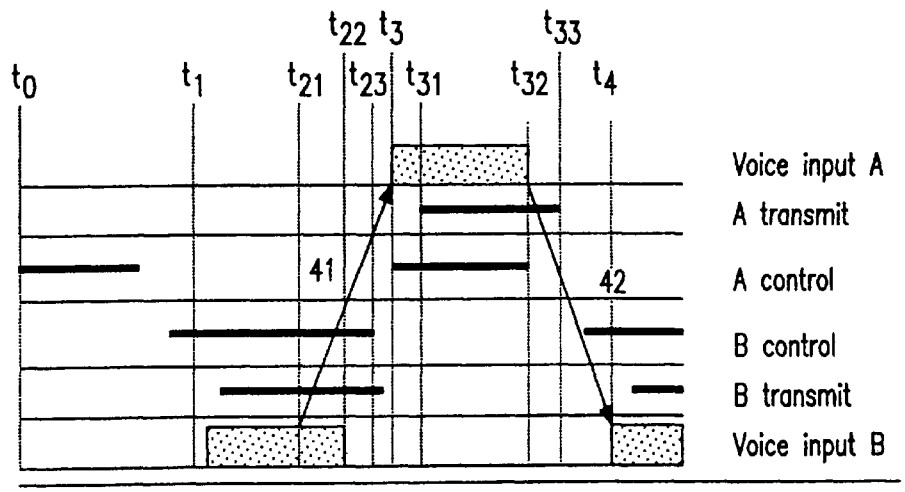
FIG. 4 shows the timing relations and echoes and voice response times of speech coding and transmission.

One possible flow of control and signalling according to the invention is shown in FIG. 4. The terminal A starts a session at time $t_0$ to with maintaining the control but calling e.g. a voice mail center B. The connection is established at $t_1$ and a message prompt voice is transmitted by B termination. The actual voice message lasts until time $t_{22}$ but before that, B sends a control message, at time $t_{2l}$ to A end to take over the control after a time is specified in that message (dashed arrow 41). Before $t_3$, the voice message at B lasts until time $t_{22}$, and its transmission until time $t_{23}$. From time $t_3$ onwards, A can send one way voice, and the voice transmission in the channel starts at time $t_{31}$. At time $t_{32}$, the end of voice message at A is detected, and accordingly, a message is sent (arrow 42) to B end to take over the control. The transmission of voice from A to B lasts until $t_{33}$, and control of voice is re-assumed by B at time $t_4$. During the voice transmissions in one direction, there may be signalling in the reverse direction, which can have the format of a short discontinuous voice burst or short message service but, in no case, a bi-directional voice communication takes place.

Figure 5:
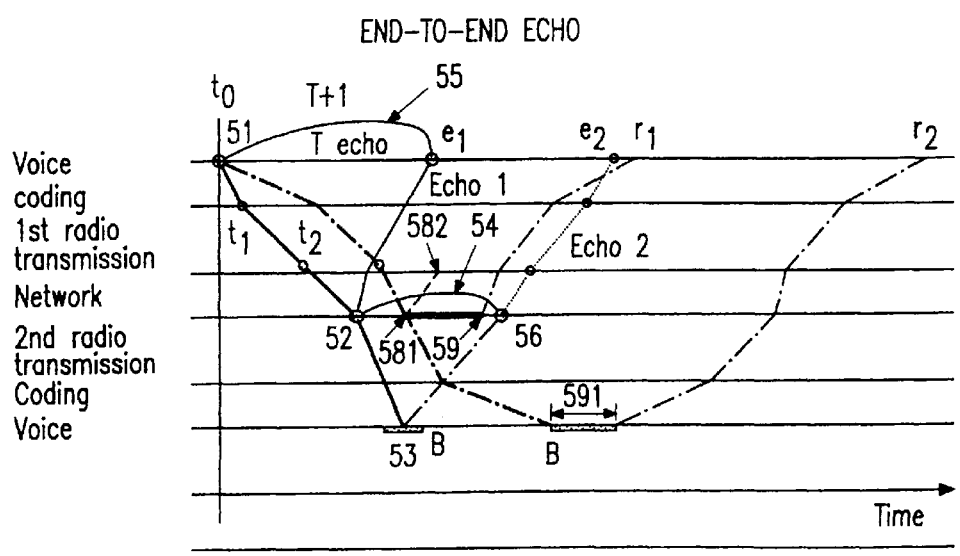
FIG. 5 shows schematically the flow of control when using one way voice transmission in an interactive communication.

The situation with respect to echo control is schematically shown in FIG. 5 which shows the delays of voice transmission from terminal A (51) back to the earpiece of it via echoes in the network interfaces (52) or B terminal 53. Time runs on the horizontal axis. A voice at time $t_0$ is coded at $t_1$ and transmitted over first radio interface at $t_2$ where first echo (echo 1) may emerge back to terminal A, arriving at time $e_1$. Thus the echo cancelling in the terminal should operate up to delay $\tau_{echo1}$, shown by arrow 55 (FIG. 5).

If the voice becomes further transmitted from network to another mobile, the next substantial echo arises from coupling (electrically and acoustically) at terminal B 53. This echo becomes transmitted back to terminal A, arriving at time $e_2$ and defining the maximum delay for echo as $\tau_{max,1}$ in the case of two way voice connection.

However, this echo is apparent already at the network interface for B terminal and becomes cancelled at this interface point, as shown by arrow 54. Thus the end-to-end echo arriving at A terminal at time $e_2$ becomes strongly attenuated at echo cancelling point 56.

Looking from the interfaces (e.g. MSC-PSTN interface), the maximum delay for echo cancelling is defined arrow 54 being the maximum time difference between signal and its echo at said point of echo cancelling.

In the case of one way voice communication, no echoes arrive at network interface points, and all networks can handle one way voice with any delay occurring in the coding/transmission part. Because the terminal has neither any coupling of received signal to its transmit path or reverse, the echo cancelling in the terminal has no relevance for transmission. Such a coupling would only be used locally in the terminal to give a feeling of being connected.

The transmission of one way voice is shown in dash-dotted lines of FIG. 5, with using a longer coding delay. A voice originated at t0 becomes coded and transmitted arriving at network interface at point 581. This point can be at any place of PSTN/ISDN/PLMN and is normally connected to radio transmission with two way voice lines involving some echo. E.g. in the case of voice mail server, the server can be located hundreds of kilometers apart from mobile/PSTN network interface.

However, due to one way voice transmission in the radio transmission, such a network generated echo is terminated at point 582 and does not arrive at terminal A. In the case of end-to-end type of one way voice transmission, all echoes are blocked by the lack of reverse transmission path in the terminal and mobile access network. Thus, one way voice transmission enables to use a long coding delay in the mobile network without problems associates with echo control in any other parts of network.

FIG. 5 also shows the timing for reverting the voice direction for mobile to-network connection, resulting in service response leaving the server at time 59 and arriving at A terminal at time $r_1$. In the case of mobile-to-mobile one way voice link, the switching over of voice direction takes accordingly a longer time (line 591), resulting a voice response arriving at A terminal from time $r_2$ onwards. Compared to round-trip delay in two way voice communication mode, the additional transmission delay due to one way is $$\tau_{ex} = 4T_{xc} + T_s$$

where $T_{xc}$ is additional delay of coding and $T_s$ is the time needed for inverting transmission delay. Additionally, the delay of message processing would be experienced by the user, but this is not related to the system described here.

The present invention gives the tools to a person skilled in the art to define and set-up a large variety of voice services based on one-way transmission.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. A communication system comprising:

a first terminal comprising multi-rate speech encoding and decoding means, a first speech signal path, a second speech signal path, and a third speech signal path, the first and second speech signal paths being acoustically coupled speech paths, the third speech signal path being a one-way voice non-acoustically coupled speech path, the first terminal using the first and second speech signal paths when operating in a first speech communication mode with a second terminal comprised in the communication system, and using the third speech signal path when operating in a second speech communication mode with the second terminal, in the second speech communication mode the multi-rate speech encoding and decoding means operating at a lower speech coding rate than in the first speech communication mode.

2. A communication system as claimed in claim 1, wherein the first terminal further comprises switching means, and the system establishes a priori whether the first terminal should operate in the second speech communication mode, the switching means switching the first terminal to the second speech communication mode if the system establishes that the first terminal should operate in the second speech communication mode.

3. A communication system as claimed in claim 1, wherein the first terminal further comprises switching means, and the system comprises detection means for detecting whether the first terminal communicates with the second terminal through a one-way speech communication link, the switching means switching the terminal to the second speech communication mode if the system detects that the first terminal communicates with the second terminal through the one-way speech communication link.

4. A communication system as claimed in 3, wherein the detection means is comprised in the second terminal.

5. A communication system as claimed in claim 3, wherein the system comprises a network, and the detection means are comprised in the network.

6. A communication system as claimed in claim 1, wherein the system comprises means for switching a direction of one-way speech communication from either one of a direction of communication from the first to the second terminal or from the second to the first terminal.

7. A communication system as claimed in claim 6, wherein the first terminal is arranged to control the direction of one-way speech communication and to convey a duration of one-way speech communication to the second terminal before starting to communicate with the second terminal, the second terminal being arranged to start one-way speech communication to the first terminal at a given point in time after expiration of the duration of one-way speech communication to the second terminal.

8. A communication system as claimed in claim 1, wherein asymmetric speech encoding and decoding is applied.

9. A communication system as claimed in claim 1, wherein the third speech signal path conveys a voice mail message.

10. A first terminal for use in a communication system comprising a second terminal, the first terminal comprising:

multi-rate speech encoding and decoding means, a first speech signal path, a second speech signal path, and a third speech signal path, the first and second speech signal paths being acoustically coupled speech paths, the third speech signal path being a one-way speech non-acoustically coupled speech path, the first terminal using the first and second speech signal paths when operating in a first speech communication mode with the second terminal, and using the third speech signal path when operating in a second speech communication mode with the second terminal, in the second speech communication mode the multi-rate speech encoding and decoding means operating at a lower speech coding rate than in the first speech communication mode.

11. A first terminal as claimed in claim 10, the first terminal further comprising switching means for switching between the first and the second speech communication modes.

12. A first terminal as claimed in claim 10, wherein the third speech signal path conveys a voice mail message.

* * * * *